United States Patent [19]

Crouch

[11] 3,951,617
[45] Apr. 20, 1976

[54] PRODUCTION OF CLEAN FUEL GAS
[75] Inventor: William B. Crouch, Whittier, Calif.
[73] Assignee: Texaco Inc., New York, N.Y.
[22] Filed: Dec. 18, 1974
[21] Appl. No.: 533,907

[52] U.S. Cl. ............................... 48/197 R; 48/200; 48/215; 252/373
[51] Int. Cl.² ........................ C10J 3/00; C01B 2/14
[58] Field of Search .................. 48/197 R, 215, 200; 252/373

[56] References Cited
UNITED STATES PATENTS
3,010,813  11/1961  Clarke et al. .......................... 48/215
3,784,364  1/1974  Slater et al. .......................... 48/215

Primary Examiner—S. Leon Bashore
Assistant Examiner—George C. Yeung
Attorney, Agent, or Firm—T. H. Whaley; C. G. Ries; Albert Brent

[57] ABSTRACT

Production of clean fuel gas having a high heating value by means of two interconnected free-flow non-catalytic partial oxidation gas generators. All of the particulate carbon produced in the effluent gas stream from both generators is recovered and burned as a portion of the feedstock in gas generator two to maximize the methane yield in gas generator one. At least a portion of the cooled and cleaned effluent gas from gas generator 2 is recycled to gas generator 1 as the temperature moderator. The cooled, cleaned, and purified effluent gas stream from gas generator one has a minimum heating value of 400 BTU/SCF and a minimum methane content of 5.0 mole % (dry basis).

6 Claims, 1 Drawing Figure

U.S. Patent April 20, 1976 3,951,617
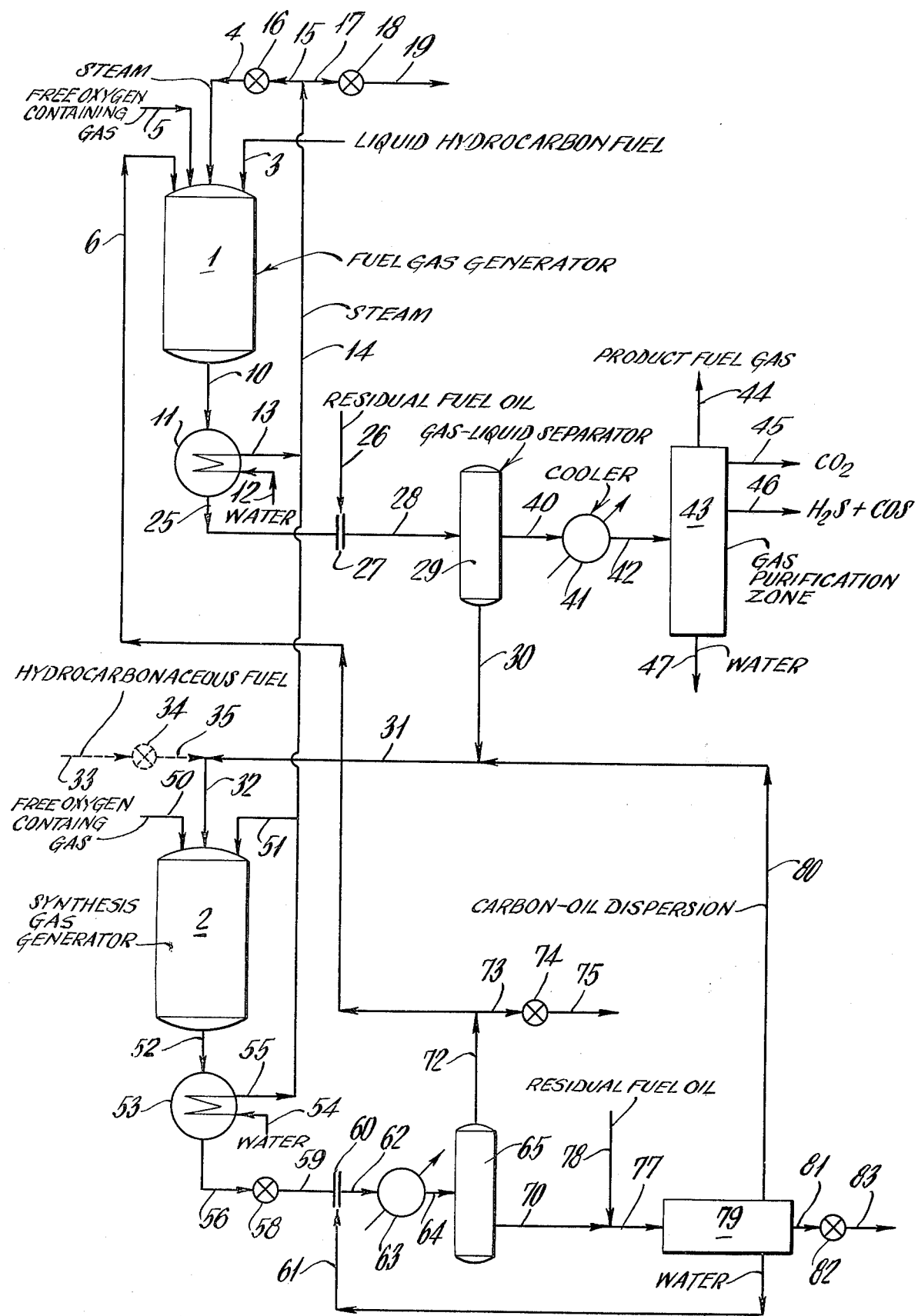

PRODUCTION OF CLEAN FUEL GAS

BACKGROUND OF THE INVENTION

1. Field of the Invention

This invention relates to a continuous process for the production of a clean fuel gas having a high heating value.

2. Description of the Prior Art

A national dilemma exists as the result of a diminishing supply of natural gas and an increasing demand for it. The impact of the gas crisis is being felt nationwide in rising prices, in governmental regulations with respect to the consumption of natural gas, and in prohibitions against the use of natural gas in future commercial, industrial and apartment-house construction. It is imperative that alternate sources of low-cost gaseous heating fuels be developed.

In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. However, this results in substantial quantities of steam which must be condensed and removed from the fuel gas. In coassigned U.S. Pat. No. 3,709,669 the synthesis gas leaving the partial oxidation gas generator is subjected to an additional step involving the water-gas shift reaction to adjust the $H_2/CO$ mole ratio to preferably 3 before catalytic methanation.

By the subject invention a clean fuel gas having a high heating value may be produced without massive amounts of steam moderator to maximize methane yield. Further, no catalytic water-gas shift or methanation steps are required in the process.

SUMMARY

This is a continuous process for the production of clean fuel gas having a high heating value i.e. at least 400 BTU/SCF. Optionally, a stream of clean synthesis gas is produced simultaneously with the fuel gas. The following steps are included in the process:

1. reacting by partial oxidation a liquid hydrocarbon fuel with a free-oxygen containing gas in the presence of a temperature moderator comprising at least a portion of the effluent gas produced downstream in the process in a second unpacked noncatalytic gas generator and cooled and cleaned in step (5), in the reaction zone of a first unpacked free-flow noncatalytic gas generator at an autogenous temperature in the range of about 1700° to 2500°F., and a pressure in the range of about 1 to 300 atmospheres to produce a gaseous effluent stream principally comprising $H_2$, CO, $CO_2$, $H_2O$, $CH_4$, and particulate carbon along with gases from the group consisting of $H_2S$, COS, A, $N_2$, and mixtures thereof;

2. introducing the gaseous effluent stream from (1) into a gas cooling and cleaning zone to remove particulate carbon and ash, and then into a gas purifying zone to remove, $CO_2$, $H_2S$, COS and $H_2O$;

3. discharging a product gas stream from (2) principally comprising $H_2$ and CO, and containing at least 5 mole % $CH_4$;

4. reacting by partial oxidation a hydrocarbonaceous fuel with a free-oxygen containing gas in the presence of a temperature moderating gas in the reaction zone of a second unpacked free-flow noncatalytic gas generator of an autogenous temperature in the range of about 1700° to 3500°F., and a pressure in the range of about 1 to 300 atmospheres to produce a gaseous effluent stream principally comprising $H_2$, CO, $CO_2$, $H_2O$ and particulate carbon along with gases from the group consisting of $CH_4$, $H_2S$, COS, A, $N_2$, and mixtures thereof;

5. introducing the gaseous effluent stream from (4) into a gas cooling and cleaning zone to remove particulate carbon and ash;

6. introducing the particulate carbon recovered from the gas cleaning zone in (2) and (5) into said second gas generator in (4) as a portion of said hydrocarbonaceous feed; and 7. introducing at least a portion of the cooled and cleaned gas stream leaving (5) into said first gas generator in (1) as at least a portion of said temperature moderator.

DESCRIPTION OF THE INVENTION

The present invention pertains to the production of a clean fuel gas having a heating value of at least 400 BTU/SCF (British Thermal Units per Standard Cubic Feet at 60° F and atmospheric pressure) as in the range of about 400 to 600 BTU/SCF by the partial oxidation of a hydrocarbonaceous fuel or mixtures of hydrocarbonaceous fuels. Optionally, a clean stream of synthesis gas e.g. gaseous mixtures principally comprising $H_2$ and CO are simultaneously produced.

In the partial oxidation of liquid and solid hydrocarbonaceous fuels the composition of the charge and the conditions of the reaction are controlled so as to produce an effluent gas stream containing from about 0.1 to 20 weight percent of entrained particulate carbon (basis weight of carbon in the carbonaceous fuel).

It is economically desirable in the partial oxidation process to recover the particulate carbon entrained in the effluent gas stream from the reaction zone, and to return the carbon to the reaction zone as a portion of the feed. However, in the subject invention it was unexpectedly found that recycle of soot to the fuel gas generator had a detrimental effect upon methane yield. Consequently, while all of the particulate carbon produced in the subject process is consumed in the process as a portion of the feedstock so as to produce additional synthesis gas, the net carbon production is substantially zero and no particulate carbon is consumed in the fuel gas generator.

In the subject process, two partial oxidation reactions are going on simultaneously in two separate but similarly constructed interconnected conventional Texaco Synthesis Gas Generators. The first of these gas generators is referred to herein as the fuel gas generator and the second gas generator is referred to as the synthesis gas generator.

At least a portion and preferably all of the synthesis gas produced in the second generator is introduced into the fuel gas generator as a temperature moderating gas. This gas stream may also be used as a carrier gas for the liquid hydrocarbon fuel introduced into fuel gas generator one. The composition of the effluent gas stream from synthesis gas generator two in mole % may comprise: $H_2$ 8 to 60, CO 8.0 to 70, $CO_2$ 1.0 to 50.0, $H_2O$ 2.0 to 50, $CH_4$ O to 5.0, $H_2S$ 0.0 to 3.0, COS 0.0 to 0.7, $N_2$ 0.0 to 85, and A 0.0 to 2.0. Entrained in the effluent gas stream is about 0.5 to 20.0 weight percent of particulate carbon (basis weight of carbon in the feedstock to the synthesis gas generator two). In addition, optionally steam may be introduced into fuel gas generator one to help control the temperature therein.

In synthesis gas generator two the temperature moderator is preferably steam. Other temperature moderating gases for synthesis gas generator two may be selected from the group consisting of $H_2O$, $CO_2$, inert gas, off-gas from an ore-reduction zone such as cooled and cleaned blast-furnace gas from the reduction of iron-ore, and a recycle portion of the cooled effluent gas from synthesis gas generator two with or without entrained particulate carbon, and mixtures thereof.

Each synthesis gas generator is free from any obstructions to the flow of the gases therethrough. Each gas generator is a cylindrically shaped vertical steel pressure vessel whose inside walls are lined with refractory. An axially aligned flanged inlet port is located at the top of each vessel, and a flanged outlet port is located at the bottom. The various feedstreams may be introduced into each gas generator at ambient temperature, but preferably they are introduced at a temperature in the range of about 100°F. to 1000°F. Preferably, an annulus-type burner is axially mounted in the top of each generator for introducing and mixing the feedstreams.

Suitable gas generators are disclosed in coassigned U.S. Pat. No. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of each free-flow noncatalytic synthesis gas generator, reaction takes place at an autogenous temperature in the range of about 1700° to 2500°F. in one generator and 1700° to 3500°F. in the other generator, and at a pressure in the range of about 1 to 300 atmospheres, and preferably in the range of about 20 to 100 atmospheres.

The pressure in synthesis gas generator two is preferably about 5–50 atmospheres greater than the pressure in fuel gas generator one. By this means, costly gas compressors for compressing at least a portion of the effluent generator gas for introduction into fuel gas generator one may be avoided.

Liquid hydrocarbon fuels are introduced into fuel gas generator one and include by definition asphalt, petroleum distillate and residua, naphtha, gas oil, residual fuel, reduced crude, whole crude, coal tar, coal oil, shale oil, and tar sand oil. Preferably, the liquid hydrocarbon fuel is the same fluid used in the carbon recovery zone, to be further described, to produce a carbon-oil dispersion.

Hydrocarbonaceous fuels are suitable feedstocks for synthesis gas generator two and include the aforesaid liquid hydrocarbon fuels and pumpable slurries of solid hydrocarbonaceous fuels e.g. coal, coke from coal, particulate carbon, and petroleum coke in a liquid hydrocarbon fuel such as previously listed, or water.

$H_2O$ may be supplied to gas generator two and optionally to gas generator one in liquid or gaseous phase. It may be introduced either separately or in admixture with the free-oxygen containing gas or with the hydrocarbonaceous feedstock, or both. Water will moderate the temperature of the reaction zone and may also react with CO and the hydrocarbon fuel in the reaction zone.

The weight ratio of the $H_2O$ introduced to total fuel present in the reaction zones of gas generators one and two is a value in the range of about 0.2 to 3.0, and preferably about 0.5 to 1.5. It is common practice to express ratios in this manner as the denominator of said ratio is one and the numerator is in the range specified, for example, 0.2 to 3.0.

The free-oxygen containing gas introduced into gas generators one and two is selected from the group consisting of air, oxygen-enriched air, i.e. at least 22 mole % oxygen, and substantially pure oxygen i.e. at least 95 mole % oxygen (the remainder comprising $N_2$, A and rare gases) and preferably 99 mole % $O_2$, or more. Substantially pure oxygen is preferred in order to reduce the amount of nitrogen and other gaseous impurities in the product gas.

The atomic ratio of oxygen in the free-oxygen containing gas to carbon in the total fuel present is in the range of about 0.6 to 1.6, and preferably 0.8 to 1.4. The amount of oxygen supplied to the gas generators is controlled so as to prevent complete oxidation of the hydrocarbonaceous feed and to control the temperature in the reaction zone.

While it is unnecessary to preheat the reactants the free-oxygen containing gas and temperature moderator may be introduced into the reaction zone at a temperature in the range of about ambient to 1000° F. Similarly, the pumpable hydrocarbonaceous fuel feed may be introduced at a temperature of about ambient to 350°F., and preferably 100° to 300°F.

An annulus type burner, such as described in coassigned U.S. Pat. No. 2,928,460 issued to du Bois Eastman et al., or in coassigned U.S. Pat. No. 3,743,606 issued to C. P. Marion et al, may be employed to introduce the reactants into the reaction zones.

By conventional means, the effluent gas stream from fuel gas generator one and that from synthesis gas generator two are cooled, and the particulate carbon and gaseous impurities are removed by conventional gas cleaning and carbon recovery methods. For example, the effluent gas stream may be passed through an in-line waste-heat boiler and partially cooled to a temperature in the range of about 400° to 800° F. by indirect heat exchange with water, thereby producing steam. The steam may be used elsewhere in the process, such as in the gas generator. Alternately, the effluent gas stream may be quenched in water in a quench tank such as shown in coassigned U.S. Pat. No. 2,896,927. In such case a large portion of the particulate carbon and other solids entrained in the effluent gas stream is removed by the quench water.

Further, particulate carbon and any other entrained solids may be removed from the effluent gas streams by well known scrubbing techniques in one or more gas-liquid scrubbing zones. For example, the particulate carbon may be removed by scrubbing the process gas with a scrubbing fluid comprising oil, water, or both by means of an orifice mixer, scrubbing nozzle or venturi scrubber such as described in Perry's Chemical Engineers' Handbook Fourth Edition, McGraw-Hill 1963, pages 18-54 to 56. Both oil and water scrubbing by means of an orifice mixer are shown in the drawing. The slurry of particulate carbon and liquid hydrocarbon scrubbing fluid from the fuel gas generator one carbon recovery zone and that recovered from the synthesis gas generator two carbon recovery zone may be combined and recycled to the synthesis gas generator two as a portion of the feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw Hill 1963, Pages 18–3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of synthesis gas generator two as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel followed by scrubbing with water, such as described in coassigned U.S. Pat. No. 3,639,261 issued to W. L. Slater.

The process gas stream leaving from the top of the scrubbing tower substantially free from particulate carbon and at a temperature in the range of about 400°–650°F. may be cooled to condense out and separate any volatilized hydrocarbons and water found therein.

$CO_2$, $H_2O$, $H_2S$ and COS are removed from the proces gas stream from fuel gas generator one in an acid-gas separation zone by a suitable conventional process involving cooling and physical or chemical absorption with solvents, such as n-methyl pyrrolidone, triethanolamine, propylene carbonate, or alternately with hot potassium carbonate. Methane should be substantially insoluble in the solvent selected. Most of the $CO_2$ absorbed in the solvent can be released by simple flashing. The stream of $CO_2$ has a purity of more than 98.5 percent and may therefore be used for organic synthesis. The regenerated solvent is then recycled to the absorption column for reuse. When necessary, final cleanup may be accomplished by passing the process gas through iron oxide zinc oxide, or activated carbon to remove residual traces of $H_2S$ or organic sulfide.

Similarly $H_2S$ and COS-containing solvent is regenerated by further flashing. The $H_2S$ and COS may be then converted into sulfur by a suitable process. For example, the Claus process may be used to produce elemental sulfur from $H_2S$, as described in Kirk-Othmer Encyclopedia of Chemical Technology, Second Edition Volume 19, John Wiley, 1969, Page 352.

By means of fuel gas generator one a substantially dry product fuel gas leaves acid-gas separation zone having the following dry gas composition in mole percent: $H_2$ 20 to 60, CO 20 to 60, $CH_4$ 7 to 40 $CO_2$ 0, $N_2$+Ar 0 to less than 20, and 0 to less than 0.1 parts per million of total sulfur i.e. $H_2S$ + COS.

DESCRIPTION OF THE DRAWING AND EXAMPLES

A more complete understanding of the invention may be had by reference to the accompanying schematic drawing which shows a preferred embodiment of the previously described process. Quantities on an hourly basis have been assigned to the various stream so that the following description may also serve as an example of the subject invention.

EXAMPLE I

On an hourly basis the charge to free-flow unpacked noncatalytic refractory lined fuel gas generator 1 comprises: about 69,377 lbs. of hydrocarbonaceous fuel such as residual fuel oil in line 3 having a temperature of about 470°F., an ultimate analysis in Wt. % of C 84.11, H 10.22, S 4.97, N 0.41, O 0.22, and Ash 0.07, and a heat of combustion 17582 BTU/Lb; about 69,377 lbs. of steam in line 4 at a temperature of about 600° F.; about 704,000 SCF of oxygen (99.5 mole % $O_2$) in line 5 at a temperature of about 100°F.; and about 3,468,850 SCF of cooled and cleaned effluent gas from gas generator two in line 6 at a temperature of about 250°F. There is substantially no particulate carbon in the feed to fuel gas generator one. An annulus type burner such as previously described but not shown in the drawing may be used to introduce said feedstreams into the reaction zone of gas generator 1.

Operating conditions in fuel gas generator one where partial oxidation of the hydrocarbonaceous feedstock takes place include: autogenous temperature 1978°F., pressure 55 atmospheres, and residence time 3.8 seconds.

The effluent gas stream leaves fuel gas generator one by way of line 10 and is cooled to a temperature of about 730°F., in waste-heat boiler 11. Boiler feed water enters boiler 11 by way of line 12 and is converted to steam which leaves by way of line 13. At least a portion of this steam is passed through lines 14–15, valve 16, and line 4 as previously described. Excess steam may be exported through line 17, valve 18, and line 19.

The cooled gas stream leaves waste-heat boiler 11 by way of line 25 and is passed into a gas scrubbing zone for the removal of entrained particulate carbon. For example free carbon may be recovered for burning in gas generator two as a carbon-oil dispersion by passing about 52988 lbs. of the aforesaid residual fuel oil through line 26 into orifice mixer 27 and mixed there with the partially cooled gas stream from line 25. The mixture of oil and gas is passed through line 28 into gas-liquid separator 29. About 61795 lbs. of a pumpable dispersion of particulate carbon and residual fuel oil, containing about 8807 lbs. of carbon is removed from separator 29 by way of line 30 and is passed through lines 31 and 32 into free-flow unpacked noncatalytic refractory lined gas generator 2 as at least a portion of the feed. Optionally, supplemental hydrocarbonaceous fuel may be introduced into gas generator 2 by way of line 33, valve 34, and line 32.

The clean effluent gas stream from gas generator 1 leaves gas-liquid separator 29 through line 40 and is further cooled in cooler 41.

5,054,000 SCF of gas in line 42 has the following composition in mole % dry basis: $H_2$ 28.46, CO 37.96, $CO_2$ 17.80, $CH_4$ 14.00, $H_2S$ 1.43, COS 0.09, $N_2$ 0.14, and A 0.12. The process gas stream may be purified in gas purification zone 43 by conventional means and separated into the following streams: a product gas stream substantially comprising $H_2$ and CO through line 44; a gas stream substantially comprising $CO_2$ through line 45; a mixture of $H_2S$ and COS which may be sent through line 46 to a Claus unit for the production of sulfur; and a stream of water through line 47.

The feed to free-flow unpacked noncatalytic refractory lined synthesis gas generator 2 comprises: about 73340 lbs. of a pumpable dispersion comprising residual fuel oil and about 10351 lbs. of particulate carbon from lines 31 and 32; about 950,833 SCF of oxygen (99.5 mole % $O_2$) in line 50 at a temperature of about 100° F.; and about 36670 lbs. of steam in line 51 at a temperature of about 600°F.

Partial oxidation of the hydrocarbonaceous feedstock including all of the particulate carbon received from the effluent gas streams from gas generators one and two takes place in synthesis gas generator two. Operating conditions in gas generator two include: autogenous temperature 2456°F., pressure 82 atmospheres, and residence time 3.9 seconds.

The effluent gas from gas generator 2 is passed through line 52 into waste heat boiler 53 in noncontact heat exchange with water which enters boiler 53 through line 54 and leaves as steam through line 55. A portion of said steam is introduced into the reaction zone of gas generator 2 by way of line 51, as previously described. A second portion of steam may be introduced into fuel gas generator 1 by way of lines 55, 14, 15, valve 16, and line 4.

The partially cooled gas stream is passed through a gas scrubbing carbon recovery zone where the entrained particulate carbon is scrubbed from the gas stream and returned to gas generator two as a portion of the feed. For example, the gas stream is passed through line 56, valve 58 and line 59 into orifice scrubber 60 where it is mixed with water from line 61. The gas-water mixture is passed through line 62, cooler 63, and line 64 into gas-liquid separator 65 where it is separated into a carbon-water dispersion which leaves by way of line 70 and a stream of synthesis gas which leaves by line 72.

In this example all of the synthesis gas in line 72 is passed through line 6 into fuel gas generator 1 as previously described. The composition of of this synthesis gas comprises in mole %: $H_2$ 39.66, CO 50.33, $CO_2$ 5.81, $H_2O$ 2.73, $CH_4$ 0.26, $H_2S$ 0.98, COS 0.06, $N_2$ 0.10, and A 0.08. Optionally, excess synthesis gas may be exported through line 73, valve 74, and line 75.

The carbon-water slurry in line 70 is introduced into line 77 where it is mixed with 10000 lbs. of the previously described residual oil from line 78. The carbon-water dispersion is resolved and in decanter 79 a carbon-residual oil dispersion is formed which floats on a water layer.

The carbon-oil dispersion is passed through line 80 into line 31 where it is mixed with the carbon-oil dispersion from line 30 which comes from the carbon recovery zone for fuel gas generator one. The mixture of carbon-oil dispersion streams in line 31 is passed into synthesis gas generator two as feed, as previously described.

Water is removed from decanter 79 through line 61 and recycled to orifice scrubber 60 to scrub particulate carbon from the synthesis gas stream as previously described. A slurry of ash and water may be periodically removed from decanter 79 by way of line 81, valve 82, and line 83.

EXAMPLE II

Example II is similar to Example I but illustrates the process when the hydrocarbonaceous feed to fuel gas generator one is the previously described residual fuel oil while the hydrocarbonaceous feed to synthesis gas generator two comprises ground coal, residual fuel oil (as previously described), and particulate carbon. Further the carbon-recovery zone for gas generator two includes conventional means for separating larger amounts of ash. A summary of the charge stream to gas generators one and two, product gas analysis, and the operating conditions follows:

FUEL GAS GENERATOR ONE

| | | |
|---|---|---|
| Residual Fuel Oil Feed, lb/hr | | 63,877 |
| Oil Temp. °F. | | 470 |
| Steam Feed/Oil Ratio, lb/lb | | 1.0 |
| Steam Temp. °F. | | 600 |
| Synthesis Gas Feed/oil Ratio, SCF/lb | | 50 |
| Synthesis Gas Analysis | | |

| $H_2$ | 32.73 | $CH_4$ | 0.26 |
|---|---|---|---|
| CO | 53.96 | $H_2S$ | 1.01 |
| $CO_2$ | 8.75 | COS | 0.08 |
| $H_2O$ | 2.73 | $N_2$ | 0.38 |
| | | A | 0.10 |

| | |
|---|---|
| Synthesis Gas Feed Temp. °F., | 250 |
| Oxygen Feed (99.5 mole % $O_2$) SCF/hr | 689,200 |
| Fuel Gas Generator Temp. °F, | 2,004 |
| Fuel Gas Generator Pressure, psig | 800 |
| Residence Time, sec. | 4.05 |
| Unconverted Carbon (% of C in Oil) | 11.0 |
| Product Gas (Dry Basis) SCF/hr | 4,787,500 |
| Product Gas Analysis | |

| $H_2$ | 22.74 | $H_2S$ | 1.62 |
|---|---|---|---|
| CO | 40.72 | COS | 0.14 |
| $CO_2$ | 20.08 | $N_2$ | 0.61 |
| $CH_4$ | 13.98 | A | 0.11 |

SYNTHESIS GAS GENERATOR TWO

| | | | |
|---|---|---|---|
| Residual Fuel Oil Feed, lbs/hr | | | 25,144 |
| Particulate Carbon Feed, lbs/hr | | | 5474 |
| Ground Coal Feed, lbs/hr | | | 58,200 |
| Water/Fuel Ratio, lb/lb | | | 0.422 |
| Water Temp., °F. | | | 100 |
| Oxygen Feed (99.5 mole % $O_2$), SCF/hr | | | 1,087,500 |
| Synthesis Gas Generator Temp., °F | | | 2,571 |
| Synthesis Gas Generator Pressure, psig | | | 1,200 |
| Residence Time, Sec. | | | 3.66 |
| Unconverted Carbon (% of C in feed) | | | 5.00 |
| Ultimate Analysis of Coal, Wt. % | | | |
| C | 72.01 | N | 1.46 |
| H | 4.90 | O | 8.94 |
| S | 3.27 | Ash | 9.42 |
| Heat of Combustion of Coal BTU/lb | | | 12,318 |

As will be apparent to those skilled in the art in light of the foregoing disclosure, many modifications, alterations and substitutions, are possible in the practice of this invention without departing from the spirit or scope thereof.

I claim:

1. A process fo the production of fuel gas comprising
    1. reacting by partial oxidation a liquid hydrocarbon fuel with a free-oxygen containing gas selected from the group consisting of air, oxygen-enriched air, i.e. at least 22 mole % oxygen, and substantially pure oxygen, i.e. at least 95 mole % oxygen, in the presence of a temperature moderator from step (7) optionally in admixture with steam, wherein said partial oxidation reaction takes place in the reaction zone of a first unpacked free-flow noncatalytic gas generator at an autogenous temperature in the range of about 1700° to 2500°F. and a pressure in the range of about 1 to 300 atmospheres to produce a gaseous effluent stream principally comprising $H_2$, CO, $CO_2$, $H_2O$, $CH_4$, and particulate carbon along with gases from the group consisting of $H_2S$, COS, A, $N_2$, and mixtures thereof;
    2. introducing the gaseous effluent stream from (1) into a gas cooling and cleaning zone to remove particulate carbon and ash, and then into a gas purifying zone to remove $CO_2$, $H_2S$, COS and $H_2O$;
    3. discharging a product gas stream from (2) principally comprising $H_2$ and CO, and containing at least 5 mole % $CH_4$;

4. reacting in a second unpacked free-flow gas generator by partial oxidation a hydrocarbonaceous fuel with a free-oxygen containing gas selected from the group consisting of air, oxygen-enriched air, i.e. at least 22 mole % oxygen, and substantially pure oxygen, i.e. at least 95 mole % oxygen, in the presence of a temperature moderator selected from the group consisting of $H_2O$, $CO_2$, inert gas such as nitrogen, off-gas from an ore-reduction zone, and a portion of cooled effluent gas from said second gas generator with or without entrained particulate carbon, and mixtures thereof, at an autogenous temperature in the range of about 1700° to 3500°F. and a pressure in the range of about 1 to 300 atmospheres to produce a gaseous effluent stream principally comprising $H_2$, CO, $CO_2$, $H_2O$ and particulate carbon along with gases from the group consisting of $CH_4$, $H_2S$, COS, A, $N_2$, and mixtures thereof;
5. introducing the gaseous effluent stream from (4) into a gas cooling and cleaning zone to remove particulate carbon and ash;
6. introducing the particulate carbon recovered from the gas cleaning zone in (2) and (5) into said second gas generator in (4) as a portion of said hydrocarbonaceous feed; and
7. introducing at least a portion of the cooled and cleaned gas stream leaving (5) into said first gas generator in (1) as at least a portion of said temperature moderator.

2. The process of claim 1 wherein supplemental steam is introduced into the reaction zone of said first gas generator to help moderate the reaction temperature therein.

3. The process of claim 1 where in the reaction zones of said first and second gas generator the atomic ratio of oxygen in the free-oxyten containing gas to carbon in the total fuel present is the range of about 0.6 to 1.6.

4. The process of claim 1 where in the reaction zones of said first and second gas generators the weight ratio of the $H_2O$ introduced to total fuel present is a value in the range of about 0.2 to 3.0.

5. The process of claim 1 wherein the liquid hydrocarbon fuel in step (1) is selected from the group consisting of asphalt, petroleum fuel oil, naphtha, gas oil, residual fuel, reduced crude, whole crude, coal tar, coal oil, shale oil, and tar sand oil, and mixtures thereof.

6. The process of claim 1 wherein the hydrocarbonaceous fuel in step (4) is selected from the group consisting of liquid hydrocarbon fuel, pumpable slurries of solid hydrocarbonaceous fuels e.g. coal, coke from coal, particulate carbon, and petroleum coke in a liquid hydrocarbon fuel or water, and mixtures thereof.

* * * * *